United States Patent [19]

Lucas

[11] Patent Number: 4,643,364
[45] Date of Patent: Feb. 17, 1987

[54] UNWINDING MACHINE FOR DISTRIBUTING FORAGE GATHERED IN ROUND BALES

[75] Inventor: Gérard Lucas, La Verrie, France

[73] Assignee: Etablissements Lucas G., La Gaubretiere, France

[21] Appl. No.: 755,507

[22] Filed: Jul. 16, 1985

[30] Foreign Application Priority Data

Jul. 20, 1984 [FR] France .................. 84 11754
Nov. 21, 1984 [FR] France .................. 84 17999

[51] Int. Cl.$^4$ ............................ B02C 18/22
[52] U.S. Cl. ...................... 241/55; 241/101 A; 241/101.7
[58] Field of Search ............ 241/101 A, 55, 101.7, 241/282.1, 282.2; 19/80 R, 80 A, 82, 86; 414/24.5, 24.6, 473

[56] References Cited

U.S. PATENT DOCUMENTS 3,035,621 5/1962 Burcham .............. 241/101 A X
4,449,672 5/1984 Morlock et al. ............ 241/101.7

FOREIGN PATENT DOCUMENTS 2715577 10/1978 Fed. Rep. of Germany ..... 414/24.6

Primary Examiner—Mark Rosenbaum
Attorney, Agent, or Firm—Berman, Aisenberg & Platt

[57] ABSTRACT

A machine permits the distribution, in rearing buildings, of forage gathered in round bales, in step with the unwinding of the said bales at the heart of the machine. The machine includes a trailer equipped with a chassis 1 fitted with a hitching drawbar 2 articulated at 25 and a set of wheels 3 mounted on side arms 4 oscillating under the effect of a ram 6. On this chassis is mounted a tub 7 equipped with a movable bottom 8 the trajectory of which incorporates a dihedral with a variable angle determined by a concave or convex diversion of the active trajectory of the conveyor belt and at any point of the latter, which conveyor belt discharges into a device for shredding and ejection, whose large-diameter rotor carries shredding teeth 22 at its front and fan blades 24 at its periphery. The dihedral angle can be adjusted by a ram 13; its position in space can be determined by the action of the ram 6 or by inflection of the drawbar around the shaft 25 or by the combination of these different actions.

11 Claims, 9 Drawing Figures

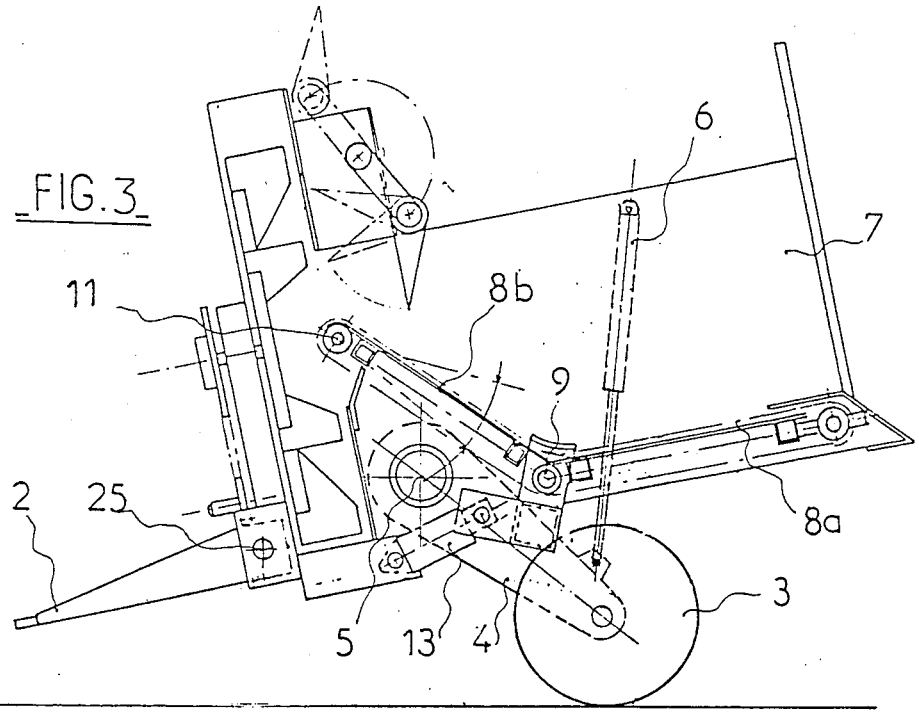
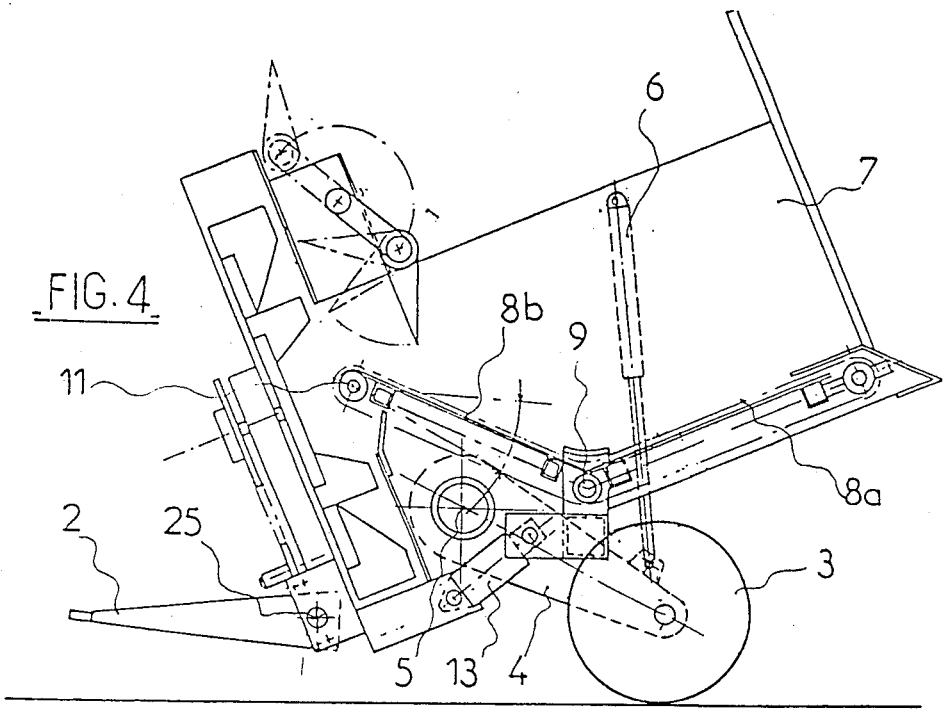

UNWINDING MACHINE FOR DISTRIBUTING FORAGE GATHERED IN ROUND BALES

BACKGROUND OF THE INVENTION

1. Field of the Invention

The present invention relates to machines permitting the distribution of forages intended for feeding cattle or for producing litter in rearing buildings, and more particularly forages in the form of round bales.

2. Prior Art

There is an increasing knowledge and utilization of the principle of collecting forages which consists in gathering the windrow deposited on the ground by means of cutting, and in winding it in the form of a spiral cylinder commonly called a round bale.

GENERAL DESCRIPTION OF THE INVENTION

The machine according to the invention permits the forage gathered in this manner to be distributed in the rearing buildings in step with the unwinding of the round bale at the heart of the machine.

The machine which is the subject of the invention consists of a trailer equipped with two wheels and a drawbar for hitching to an agricultural tractor. The trailer incorporates a tub of the volume required to contain at least one round bale arranged horizontally so that its axis is placed in a frontal plane of the tub. The bottom of the tub is equipped with a conveyor device of the type with side chains connected by rods, which conveyor device has a trajectory in the shape of a dihedral with a fixed or variable angle, formed by a substantially horizontal plane of travel of the product and a rising inclined plane opening at its end in a device for shredding and ejecting the product, consisting of a turbine whose rotor, of a large diameter and equipped on its front face with shredding teeth and on its periphery with fan blades, rotates inside a fairing opening outwards via one or more distribution orifices. The change in the dihedral angle formed by the conveyor belt can be produced manually or with the aid of one or two hydraulic rams acting on the inclined part of the said belt by causing the said part to pivot around the horizontal axis common to the driving sprockets situated at the topmost point of the inclined part of the conveyor. In a manner which is complementary to such an arrangement, the machine incorporates means which make it possible to vary the position of the dihedral in space. Thus, the wheels of the trailer may be mounted on an axle carried by each of the side arm ends joined integrally to the same horizontal shaft and whose pivoting maneuvre tends to modify the ground clearance of the trailer by raising the rear of the latter while keeping the hitching point of the drawbar on the tractor as a fixed point; the dihedral of the conveyor belt is then like a movable V-shaped support, eliminating the tendency of the round bale to move towards the rear of the trailer and thus permitting the said bale to be maintained at a constant distance relative to the front and rear ends of the tub as it unwinds under the effect of belt displacement. The same result may be obtained by means of an articulation of the drawbar on the chassis of the trailer, in or without conjunction with the device for raising the rear of the trailer, described earlier. The trailer equipment is supplemented by a harrow arranged frontally at the inlet for the product and upstream of the latter's axis zone in the device for shredding and ejection; the objective of this harrow, equipped with retractable or non-retractable teeth with return springs is to exert a continual pressure on the product when the machine is employed for distributing forage from a silo. It is designed so as to be capable of being lifted for using the machine as an unwinder for round bales.

Another aim of the invention is to be capable of situating the dihedral at any point whatever in the active trajectory of the movable belt, between a horizontal upstream portion of trajectory, of variable length, and a horizontal downstream portion of trajectory, of fixed length, which upstream and downstream portions can be situated in the same plane or in different planes, the direction of displacement of the belt being reversible in some cases so as to produce the discharge of the unwound product, towards the rear, in the form of a mat which may or may not be expanded before it is deposited on the ground.

BRIEF DESCRIPTION OF THE DRAWINGS

The attached drawings illustrate possible embodiments of the machine in accordance with the present invention. They show.

DESCRIPTION OF PREFERRED EMBODIMENT

Figure 1:
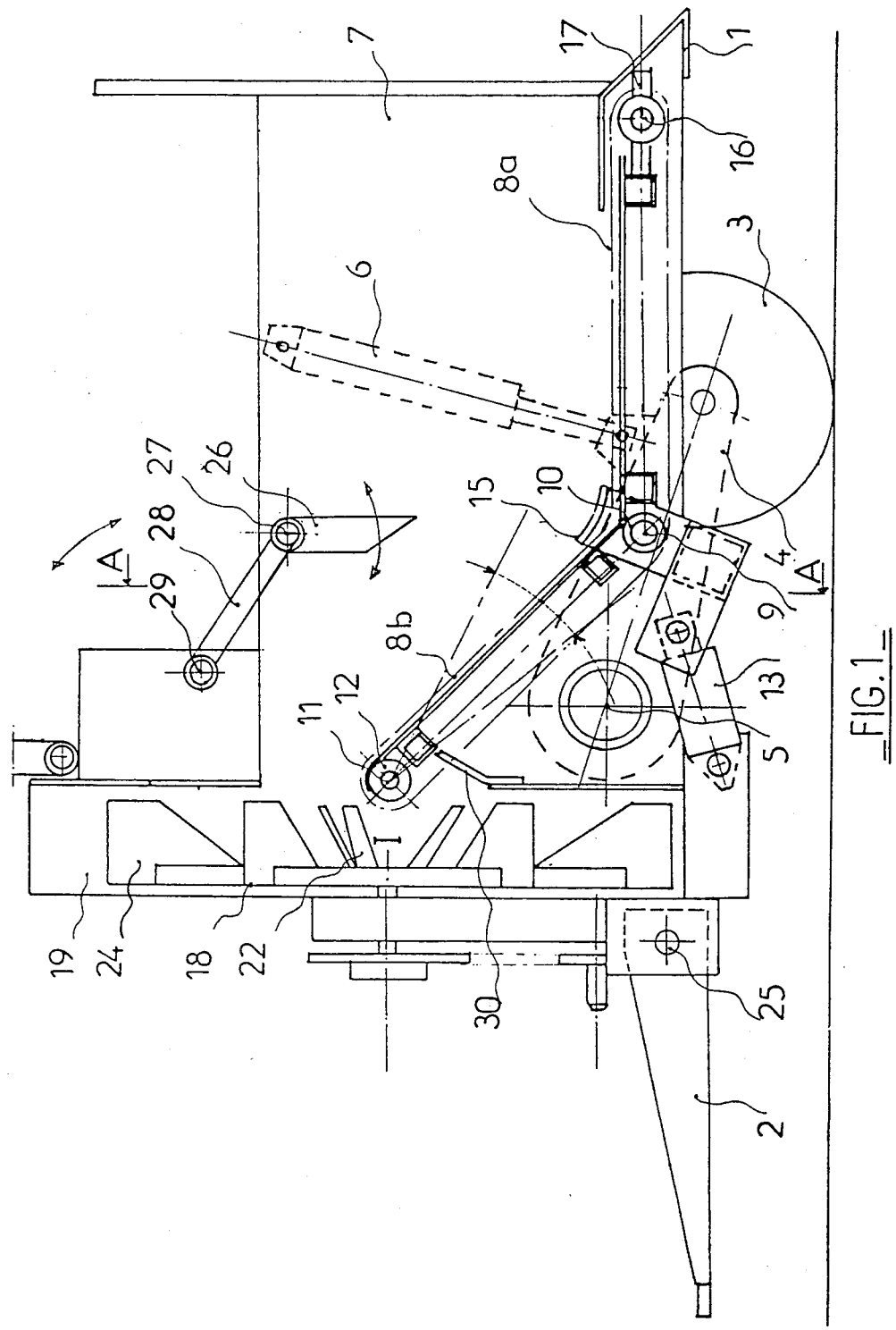
In FIG. 1, a view of the machine in lengthwise section according to an embodiment in which the dihedral of the conveyor belt can be regulated hydraulically, In FIG. 2, a view of the same machine in cross-section along AA, In FIGS. 3 and 4, lengthwise diagrammatic views of possible configurations of the trailer, In FIG. 5, a lengthwise diagrammatic view of the conveyor belt in which the dihedral is formed by a trajectory of the conveyor belt, according to a dihedral of variable angle, but whose rising inclined part opens at the top part on a horizontal trajectory portion of fixed length, In FIG. 6, a lengthwise diagrammatic view of the conveyor belt, in which the dihedral necessary for holding the bale in a fixed position relative to the front and rear ends of the tub as it unwinds, is formed by a lift of the conveyor belt relative to the upstream and downstream trajectory portions, the bale being capable of being placed on either side of this lifting, depending on the direction of belt travel, In FIG. 7, a diagrammatic view on a smaller scale, illustrating the reversal of the direction of passage of the belt, In FIG. 8, a lengthwise diagrammatic view of the conveyor belt, in which the dihedral is formed by a hollow produced on a part of the belt trajectory, between the upstream portion of the trajectory and the downstream portion of the trajectory, In FIG. 9, a diagrammatic view, on a smaller scale, illustrating the reversal of the direction of belt travel.
Figure 2:
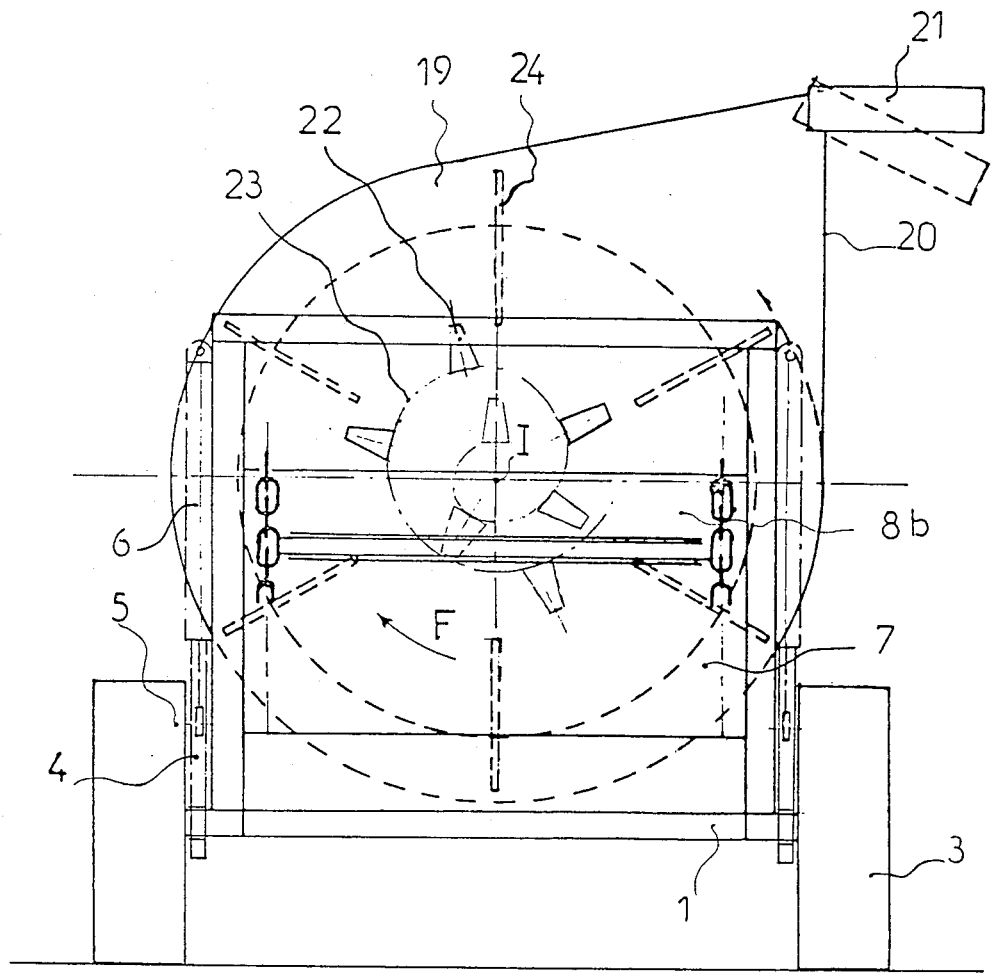

As depicted, the trailer consists of a chassis 1 incorporating a drawbar 2 at the front permitting it to be hitched to a tractor. This chassis is carried by a pair of wheels 3 mounted on a common axle connecting two side arms 4 capable of oscillating around axles 5 under the action of double-acting hydraulic rams 6, the maneuvering of which causes the rear of the trailer to rise or drop, the hitching point on the tractor corresponding to the end of the drawbar being fixed. The chassis carries a parallelepipedal tub 7 of sufficient volume to receive at least one round bale arranged transversely and horizontally in the tub. The bottom of the tub is equipped with a conveyor belt 8 of the type with side driving chains connected together by transverse rods. This belt has a trajectory arranged according to a dihedral incorporating a substantially horizontal part 8a and a rising inclined part 8b, which are jointed together around a horizontal shaft 9 passing through side pulleys 10 allowing the trajectory of the belt to be changed and situated at the downstream end of its part 8a. The rising part 8b of the conveyor belt is mounted so as to oscillate around the horizontal shift 11 passing through the sprockets 12 for driving the belt and which is situated at the topmost point of its trajectory. The adjustment of inclination of the part 8b, that is to say the adjustment of the dihedral angle formed by this part with the part 8a can be made manually or with the aid of a double-acting hydraulic ram 13 the effect of which acts on a crossbar 14 carrying at its ends the side pulleys 10 and the guides for the chains 15 enabling the trajectory of the latter to be changed. The angular change in the dihedral results in a translational displacement of the upstream end of the belt part 8a; for this purpose, the driving sprockets 16 with which this end is equipped are mounted on a skid movable in translation in a slide 17 fixed integrally to the chassis.

The rising part 8b of the belt discharges into a zone situated substantially in the axis of the rotor 18 of a large-diameter turbine rotating inside a volute 19 forming the fairing of a fan for ejecting the product outwards through a side orifice 20 fitted with a deflector 21. In its central part, the front face of the rotor incorporates a number of teeth 22 forming the shredding device; in a preferred embodiment, these teeth are distributed in a slightly inclined position, according to a snail or Archimedes' spiral arrangement 23, so that the teeth succeed each other during the rotation of the rotor in the direction of the arrow F, moving away in succession from the pole I of the spiral, coinciding with the center of the rotor. Such an arrangement promotes the rejection of the shredded product towards the periphery, where it is then taken over by the rotor blades 24.

In order to facilitate access to the round bale at the rising part 8b of the conveyor belt, and its unwinding on the said part, the bale being driven on itself by the action of the transverse rods of the belt, it is possible to act either on the ram 13 controlling the angular variation of the dihedral, and optionally on the ram or rams 6 controlling the lifting of the rear of the trailer, or alternately to inflect the hitching by jointing around a horizontal shaft 25 situated at the connection of the drawbar 2 to the chassis, each of these maneuvers being capable of being carried out separately or in combination with one or the other two together, as shown diagrammatically in FIGS. 3 and 4.

Figure 5:
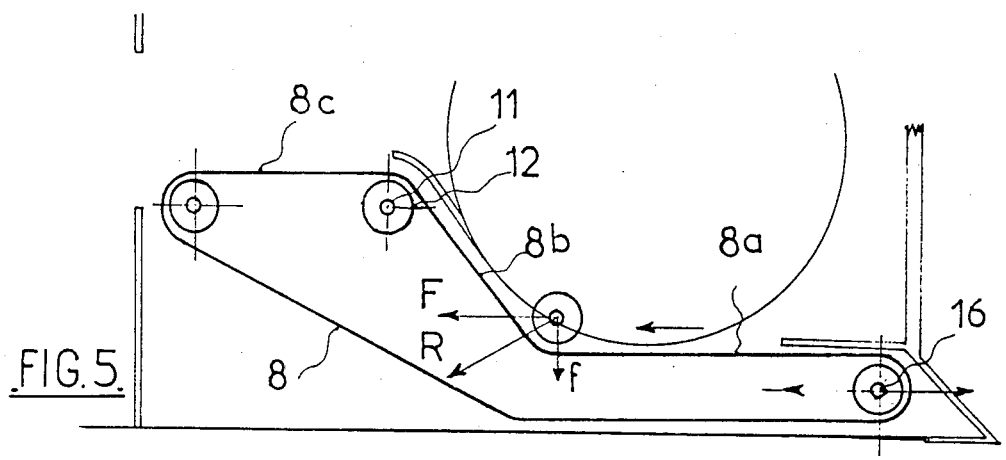

As shown in FIG. 5, the trajectory of the conveyor belt 8 incorporates a substantially horizontal part 8a and a rising inclined part 8b, the latter being capable of occupying a more or less inclined position by oscillating around the axle 11, carrying the sprockets 12 for driving the belt at the topmost point of its rising trajectory. The belt trajectory is extended at this point by a horizontal downstream portion 8c of a fixed length; the passage of the unwound product over this portion of trajectory can make it possible to carry out a disentangling operation on the product with the aid of a battery of beaters, for example, before being discharged through the orifice giving access to the device for shredding and ejection. The change in the dihedral angle can be produced by displacement of the point of articulation of the trajectory portions 8a and 8b, by horizontal and/or vertical displacement shown respectively by the arrows F and f or their resultant R. This change in angle is made possible by the translationally sliding mounting of the axle 16 carrying the end sprockets of the belt.

Figure 6:
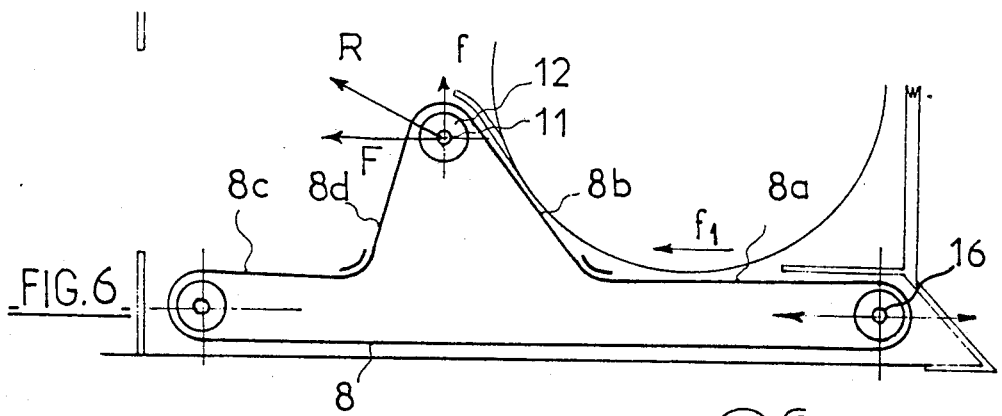
Figure 7:
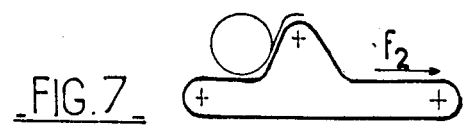

In the alternate embodiment shown in FIG. 6 the trajectory of the conveyor belt 8 consists of a horizontal upstream portion 8a, an inclined part 8b rising up to a topmost point corresponding to the belt travel over the driving sprockets 12, followed by a descending inclined portion 8d ending in a horizontal downstream portion of trajectory 8c of a fixed length the purpose of which is identical to that defined in the case of FIG. 5. Depending on the direction of movement of the belt along f1, the dihedral to be considered for holding the stooks is that formed by the parts 8a and 8b. For a movement in the opposite direction, that is to say following the arrow f2 (FIG. 7), the dihedral to be considered is that formed by parts 8c and 8d, the bale to be unwound being then placed on the part 8c, between the front end of the trailer and the inclined part 8d. The change in the dihedral angle can be produced, in either case, by movement of the shaft 11 carrying the belt-driving sprockets 12, by horizontal and/or vertical displacement, shown respectively by the arrows F and f or their resultant R, this change being made possible by the translational mobility of the shaft 16 carrying the end sprockets of the upstream portion of the belt.

Figure 8:
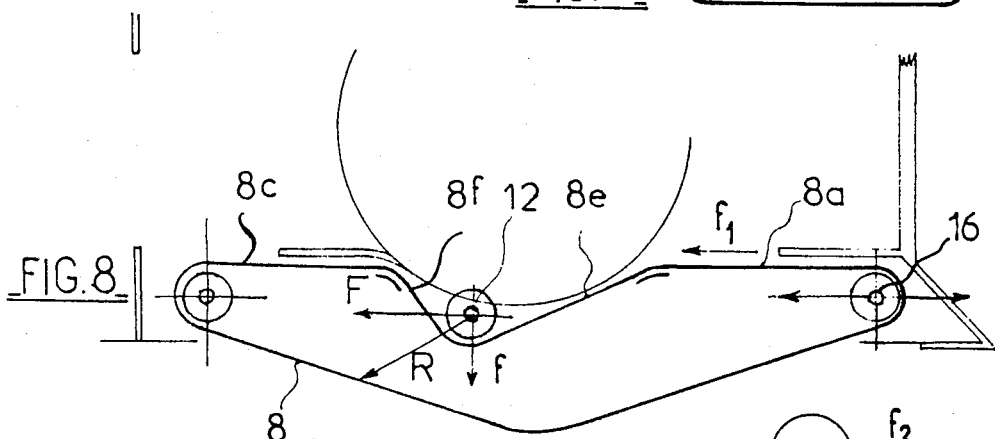
Figure 9:
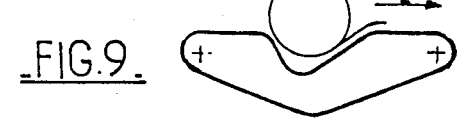

In the example of an alternate embodiment illustrated in FIG. 8, the belt trajectory consists of a horizontal upstream portion 8a, a descending inclined part 8e down to the lowest point of the trajectory corresponding to the belt travel over the driving sprockets 12, followed by a rising inclined part 8f ending in a horizontal downstream portion of trajectory 8c of a fixed length, the purpose of which is identical to that defined in the two preceding alternative forms. The change in the dihedral angle may be produced by movement of the shaft 11 carrying the belt-driving sprockets 12, by horizontal and/or vertical displacement shown respectively by the arrows F and f or their resultant R, this change being made possible by the ability to move in translation the shaft 16 carrying the end sprockets of the upstream portion of the belt. Such an arrangement ensures that the bale is held at a constant distance from the ends of the tub, as it is unwinding, whatever the direction of movement of the belt along f1 or f2 (FIG. 9).

In either of these alternate forms, the horizontal downstream portion of trajectory makes it possible to make the layer of product homogeneous before its entry into the shredding device, and thus ensures a uniform rate of distribution of the said product by the machine.

The trailer, as described, can also be employed for the distribution of products from a silo which have been deposited in the tub with the aid of a grab. In this case it is equipped with a harrow or comb 26 whose vertically arranged teeth can be fixed or retractable by rotation around a horizontal shaft 27; in this case, each tooth is subjected to the action of a return spring. The objective of this comb is to apply a continual compact pressure to the product; it is supported at its two ends by arms 28 swinging around a horizontal shaft 29 permitting, on the one hand, a positioning of the harrow teeth in height depending on the required output of the product, or a complete retraction of the comb for the use of the trailer as an unwinder for round bales.

The access to the unwound forage or to the product from a silo at the shredding device is obtained through a cutout in the fairing 19 of the ejection fan, which cutout is of rectangular shape, and is edged in its low part by a flexible bib 30 intended to prevent the product falling under the part 8b of the belt.

The invention is not restricted to the embodiments specially described, but it embraces all the possible alternative forms provided that they are not in conflict with the subject of each of the claims attached to the present description.

Thus, in either case, the dihedral can have a fixed angular value and be situated at any point between the upstream and downstream portions in the embodiments according to FIGS. 6 or 8.

The machine which is the subject of the invention may be employed for unwinding any round bales of forage and the distribution of the latter as feed stuff for cattle or as litter.

What is claimed is:

1. A machine for the distribution of forage provided in bales comprising a trailer paving a frame provided with a drawbar for hitching to a tractor, tub means having a movable bottom for conveying the forage toward means for shredding and ejection which comprises a turbine with a large-diameter rotor which rotates within a fairing opening outwards via at least one side orifice, means for unwinding bales comprising a movable bottom whose trajectory includes a dihedral with a variable angle inside which the bale of forage is unwound, means for diverting the active trajectory of a conveyor belt to form said dihedral, the passage of the unwound produce over said trajectory causing a disentangling operation to be effected before its discharge towards said means for shredding and ejection, the direction of movement of the belt being reversible to discharge the unwound product towards the rear of the tub in the form of a mat.

2. The machine as set forth in claim 1, wherein the movable bottom is a conveyor belt provided with side chains connected by rods, the trajectory of said belt comprising a generally horizontal part extending between side pulleys and driving sprockets and a rising inclined part, side parts being joined together around a horizontal shaft carrying the side pulleys, said rising inclined part being mounted to piovt around a horizontal, fixed shaft passing through the belt-driving sprockets situated at the topmost point of the belt trajectory.

3. A machine as set forth in claim 2, comprising a double-action hydraulic ram for adjusting the slope of the rising part ofthe trajectory of the conveyor belt, said double-acting hydraulic ram acting on a crossbar carrying at its ends side pulleys and guides for the chains permitting said trajectory to be modified.

4. A machine as set forth in claim 12, wherein each of the driving sprockets situated at the upstream end of the part of the conveyor belt is mounted on a slide movable in translation along a slide fixed integrally to the frame, to permit the translational movement of said end imparted by angular changes in the dihedral.

5. A machine as set forth in claim 1, wherein the trajectory of the conveyor belt consists of a horizontal upstream portion of variable length, an inclined part rising up to a topmost point corresponding to belt travel over the driving sprockets, followed by a descending inclined part ending on a horizontal downstream portion of a trajectory of fixed length, the dihedral making it possible to hold the bale during its unwinding for movement of the belt from upstream towards downstream, that formed by the upstream portion and the inclined part and, for a reverse direction of movement of the belt, the dihedral formed by the horizontal downstream and the descending inclined part, the change in the angular value of the dihedral being capable of being produced in either case by displacement of the shaft carrying the belt-driving sprockets situated at the topmost point of the active trajectory, by horizontal and/or vertical displacement this modification being made possible by the translational nobility of the shaft carrying the end sprockets of the upstream portion of the belt, said sprockets being mounted on a skid traveling in a slide.

6. A machine as set forth in claim 1, wherein the trajectory of the belt consists of a horizontal upstream portion of variable length, a descending inclined part down to the lowest point of the trajectory corresponding to the belt travel over driving sprockets, followed by a rising inclined part ending on a horizontal downstream portion of trajectory of fixed length, the dihedral enabling the bale to be held during the unwinding thereof irrespective of the direction of movement of the pelt, the modification in the angular value of the dihedral being capable of being produced by displacement of a shaft carrying belt-driving sprockets located at the lowest point of the trajectory, by horizontal and/or vertical displacement, this modification being made possible by the translation mobility of a shaft carrying the end sprockets of the upstream portion of the belt, which sprockets are mounted on a skid traveling along a slide.

7. The machine as set forth in claim 6, wherein the end of the downstream portion of the trajectory of the conveyor belt is provided with a rectangular cutout made in the front face of the fairing of the ejection device, said cutout being edged at its low part by a flexible partition for preventing the product falling under the belt.

8. The machine as set forth in claim 1, wherein the shredding device comprises a plurality of teeth fixed into the front face of the rotor of an ejection fan, in a slightly inclined position and concurrent towards the rotor shaft and distributed along an Archimedes' screw such that, depending on the direction of rotation, the fixing points of the successive teeth move away from the pole of the spiral, which is situated on the rotor shaft, such an arrangement promoting the rejection of the shredded product towards the periphery to be taken over by the blades of the ejection fan.

9. The machine as set forth in claim 1, comprising in the upper part of the tub and upstream of an orifice for the entry of the product into the shredding zone, harrow means having vertical teeth for applying a continual pressure onto the product, said harrow means being supported at the ends thereof by side arms swinging around a horizontal shaft, thus enabling a section of the teeth of the comb to be adjusted in height depending on the required output of the product, or to be retracted for the use of the machine as an unwinder for round bales.

10. The machine as set forth in claim 1, wherein for changing the spatial position of the dihedral, the trailer wheels are mounted at the end of the side arms pivoting to cause the lifting or the lowering of the rear of the trailer, the point of nitching to the tractor remaining stationary.

11. The machine as set forth in claim 1, wherein for changing the position of the dihedral, the drawbar is articulated to the frame around a horizontal shaft.

* * * * *